United States Patent
Wada

(10) Patent No.: US 7,626,619 B2
(45) Date of Patent: Dec. 1, 2009

(54) DIGITAL CAMERA

(75) Inventor: Tetsu Wada, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 556 days.

(21) Appl. No.: 11/287,436

(22) Filed: Nov. 28, 2005

(65) Prior Publication Data

US 2006/0139468 A1 Jun. 29, 2006

(30) Foreign Application Priority Data

Nov. 30, 2004 (JP) .......................... P. 2004-346442

(51) Int. Cl.
*H04N 5/335* (2006.01)
(52) U.S. Cl. .................................. 348/272; 348/70
(58) Field of Classification Search ......... 348/268–280, 348/242, 256, 260
See application file for complete search history.

(56) References Cited

U.S. PATENT DOCUMENTS

| | | | | |
|---|---|---|---|---|
| 4,121,244 A | * | 10/1978 | Nakabe et al. | 348/276 |
| 5,018,006 A | * | 5/1991 | Hashimoto | 348/275 |
| 5,579,047 A | * | 11/1996 | Yamagami et al. | 348/242 |
| 5,579,407 A | * | 11/1996 | Murez | 382/164 |
| 7,218,348 B2 | * | 5/2007 | Misawa | 348/275 |

FOREIGN PATENT DOCUMENTS

JP 2003-318375 11/2003
JP 2003318375 A * 11/2003

* cited by examiner

*Primary Examiner*—David L Ometz
*Assistant Examiner*—Ahmed A Berhan
(74) *Attorney, Agent, or Firm*—McGinn IP Law Group, PLLC

(57) ABSTRACT

A solid-state image pickup element is mounted on a digital camera. The solid-state image pickup element has: first color pixels which detect an amount of incident light of a first color of the three primary colors; second color pixels which detect an amount of incident light of a second color; third color pixels which detect an amount of incident light of a third color; and luminance detection pixels which are adjacent to the color pixels, respectively, and which detect luminance information. In the digital camera, when data of a reduced image in which the resolution is more reduced than the resolution of all the pixels of the solid-state image pickup element are to be produced, data of each of the color pixels (R, G, B), and data of one or more of the luminance detection pixels (Y) which are adjacent to the color pixel are added together. A signal processing is applied to the added data to reproduce a photographed image.

18 Claims, 4 Drawing Sheets

BECAUSE OF SAME PIXEL ARRANGEMENT, FURTHER ADDITION IS ENABLED

FIG. 3

| R | Y | B | Y | R |
|---|---|---|---|---|
| Y | G | Y | G | Y |
| B | Y | R | Y | B |
| Y | G | Y | G | Y |
| R | Y | B | Y | R |

| R | Y | B | Y | R |
|---|---|---|---|---|
| Y | G | Y | G | Y |
| B | Y | R | Y | B |
| Y | G | Y | G | Y |
| R | Y | B | Y | R |

11

} PAIR OF VERTICAL ADDITION

} PAIR OF VERTICAL ADDITION

BECAUSE OF SAME PIXEL ARRANGEMENT, FURTHER ADDITION IS ENABLED

DIGITAL CAMERA

BACKGROUND OF THE INVENTION

1. Field of the Invention

The present invention relates to a digital camera on which a solid-state image pickup element having color detection pixels for R (red), G (green), and B (blue) and luminance detection pixels is mounted.

2. Description of the Related Art

A solid-state image pickup element which is mounted on a digital camera to take a color image has color filters of the three primary color R, G, and B that are arranged in, for example, the Bayer pattern. In a configuration in which only R, G, and B color filters are disposed, when the color of an object is biased, there is a problem in that the luminance resolution of a photographed image is impaired.

In order to solve the problem, JP-A-2003-318375 discloses a related-art technique in which, among pixels constituting a solid-state image pickup element, pixels in a checkered pattern position are used as luminance detection pixels, and R, G, and B color filters are formed on respective pixels in the other checkered pattern position, so that the luminance resolution of a photographed image does not depend on the color of an object.

In some of digital cameras on which a solid-state color image pickup element where luminance detection pixels are formed is mounted, when a motion picture is to be photographed, for example, reduced image data are read out from the solid-state image pickup element in order to enhance the frame rate.

Also JP-A-2003-318375 teaches a technique for reading reduced image data from the solid-state image pickup element. For example, image data are not read out from the luminance detection pixels, image data are read out only from color detection pixels having respective R, G, and B filters, and the image resolutions in both the vertical and horizontal directions are accurately reduced to ½.

In the case where reduced image data are read out from a solid-state image pickup element, when the reading is performed while pixels are decimated as described above, all photo data of the decimated pixels are wasted. In recent solid-state image pickup elements, the number of pixels reaches the limits of the technology, and the signal charge amount which can be received by one pixel is very small. When image data are read out from a solid-state image pickup element while decimating pixels, therefore, there arises a problem in that the luminance sensitivity is lowered.

SUMMARY OF THE INVENTION

It is an object of the invention to provide a digital camera in which data of a reduced image can be read out from a solid-state image pickup element without lowering the luminance sensitivity.

The digital camera of the invention is a digital camera comprising a solid-state image pickup element, the solid-state image pickup element comprising: first color pixels which detect an amount of incident light of a first color of three primary colors; second color pixels which detect an amount of incident light of a second color of the three primary colors; third color pixels which detect an amount of incident light of a third color of the three primary colors; and luminance detection pixels which detect luminance information, each of the luminance detection pixels being adjacent to each color pixel of the first, second and third color pixels, wherein the digital camera comprises: a controlling section that, when data of a reduced image in which a resolution is more reduced than a resolution of all pixels of the solid-state image pickup element are to be produced, adds data of each of a set of color pixels to be selected among color pixel of the first, second and third color pixels and data of one or more of the luminance detection pixels which are adjacent to said each of the set of color pixels to be selected; and a signal processing section that processes data of the set of color pixels to be selected to which data of luminance detection pixels have been added, and reproduces a photographed image.

According to the configuration, a reduced image can be obtained without impairing the luminance.

In the digital camera of the invention, the solid-state image pickup element is of a CCD type, and the controlling section comprises an adding and reading section that, when data are to be read out from each of pixels of the solid-state image pickup element, adds data of each of the set of color pixels to be selected and data of one or more of the luminance detection pixels which are adjacent to said each of the set of color pixels to be selected, and reads out resulting data.

According to the configuration, as compared to a CMOS solid-state image pickup element, an image which is brighter, and which has a higher color reproducibility can be photographed. Furthermore, the addition of pixel data can be facilitated, and the frame rate can be made higher.

In the digital camera of the invention, the solid-state image pickup element is of a MOS type, and the controlling section comprises a data adding section that, after data of all pixels of the solid-state image pickup element are read out, adds data of each of the set of color pixels to be selected and data of one or more of the luminance detection pixels which are adjacent to said each of the set of color pixels to be selected.

According to the configuration, even a MOS solid-state image pickup element can obtain a bright reduced image.

In the digital camera of the invention, the first, second and third color pixels and the luminance detection pixels are arranged in a surface portion of the solid-state image pickup element so as to form a square lattice pattern, the square lattice pattern comprises: a first checkered pattern in which the first, second and third color pixels are arranged; and a second checkered pattern in which the luminance detection pixels are arranged.

According to the configuration, in the case where data are read out from pixels of the solid-state image pickup element and a photographed image is reproduced at a resolution of all pixels, even when the color of an object is biased, it is possible to avoid a situation where the luminance resolution depends on the color.

In the digital camera of the invention, data of each of the set of color pixels to be selected and data of one or more of the luminance detection pixels which are vertically adjacent to said each of the set of color pixel to be selected are added together.

According to the configuration, in the case of a CCD solid-state image pickup element, pixel addition in a vertical transfer path is facilitated.

BRIEF DESCRIPTION OF THE DRAWINGS

FIG. 3 is a surface diagram of 5×5 pixels of a solid-state image pickup element shown in FIG. 1;

FIG. 4 is a diagram illustrating an example in which a reduced image where the resolution is reduced to ½ is read out from the solid-state image pickup element shown in FIG. 3.

DETAILED DESCRIPTION OF THE INVENTION

Hereinafter, an embodiment of the invention will be described with reference to the accompanying drawings.

Figure 1:
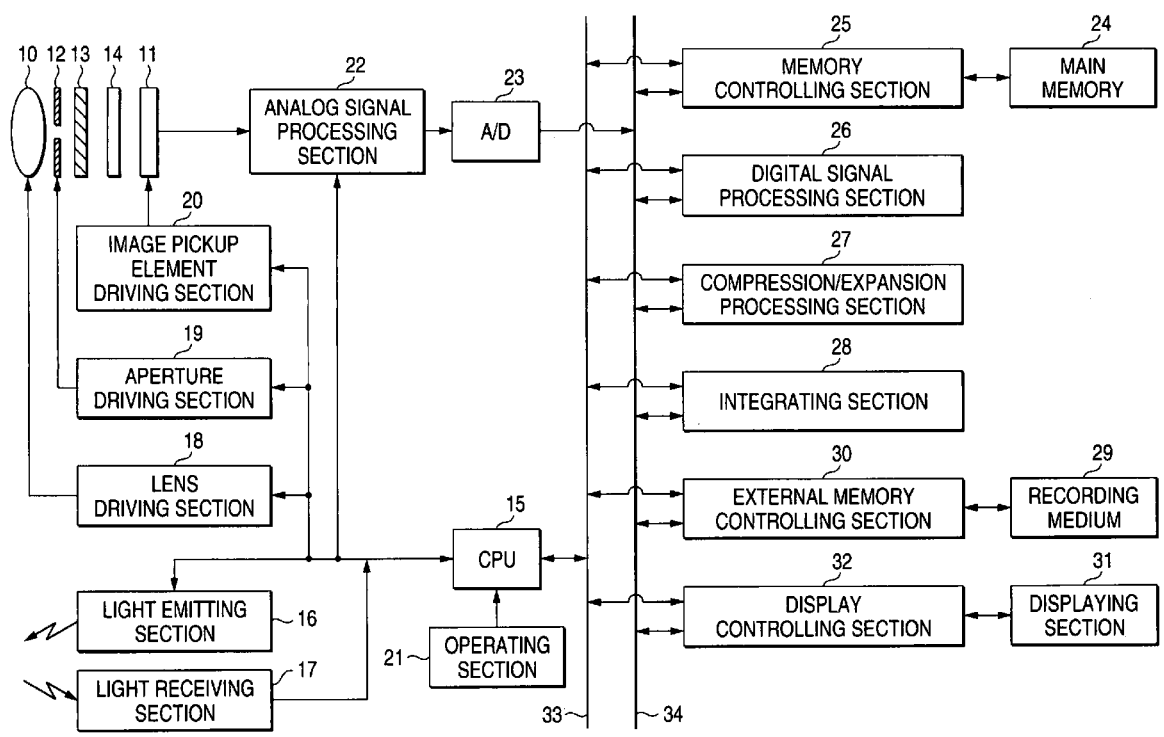
FIG. 1 is a functional block diagram of a digital still camera of an embodiment of the invention.

FIG. 1 is a diagram of a digital still camera of the embodiment of the invention. Although a digital still camera will be exemplarily described as the embodiment, the invention can be applied also to digital cameras of other kinds such as a digital video camera, and a camera mounted on a portable telephone or a like small electronic apparatus.

The digital still camera shown in FIG. 1 comprises: an imaging lens 10; a CCD solid-state image pickup element 11; an aperture 12 disposed between them; an IR cut filter 13; and an optical low-pass filter 14. A CPU 15 which controls the whole digital still camera controls a light emitting section 16 for a flash, and a light receiving section 17, controls a lens driving section 18 to adjust the position of the imaging lens 10 to the focus position, and controls the opening amount of the aperture via an aperture driving section 19 to adjust the exposure to an adequate value.

In the embodiment, the solid-state image pickup element 11 has: color pixels which detect a signal corresponding to the amount of incident light of red (R); color pixels which detect a signal corresponding to the amount of incident light of green (G); color pixels which detect a signal corresponding to the amount of incident light of blue (B); and in addition luminance detection pixels which detect luminance information (Y). The solid-state image pickup element 11 may not be of the CCD type, and may be of other types such as the CMOS type.

The CPU 15 drives the solid-state image pickup element 11 via an image pickup element driving section 20 so that an object image taken through the imaging lens 10 is output as color signals. The manner of driving the element will be described in detail later. An instruction signal from the user is supplied to the CPU 15 via an operating section 21, and the CPU 15 conducts various controls in accordance with the instructions.

The operating section 21 includes a shutter button. When the shutter button is in a half-depressed state (switch S1), the focus is adjusted, and, when the shutter button is in a fully-depressed state (switch S2), a photographing operation is performed.

An electric control system of the digital still camera comprises: an analog signal processing section 22 which is connected to the output of the solid-state image pickup element 11; and an A/D converter circuit 23 which converts the R, G, and B color signals and a luminance detection signal Y that are output from the analog signal processing section 22, to digital signals. These sections are controlled by the CPU 15.

The electric control system of the digital still camera further comprises: a memory controlling section 25 which is connected to a main memory (frame memory) 24; a digital signal processing section 26 (signal processing section) for performing signal processing which will be described in detail later; a compression/expansion processing section 27 which compresses a photographed image to a JPEG image and expands a compressed image; an integrating section 28 which integrates photometric data to enable the gain of white balance to be adjusted; an external memory controlling section 30 to which a detachable recording medium 29 is to be connected; and a display controlling section 32 to which a liquid crystal displaying section 31 mounted on, for example, the back face of the camera is connected. These components are connected to one another through a control bus 33 and a data bus 34, and controlled by instructions from the CPU 15.

Figure 2:
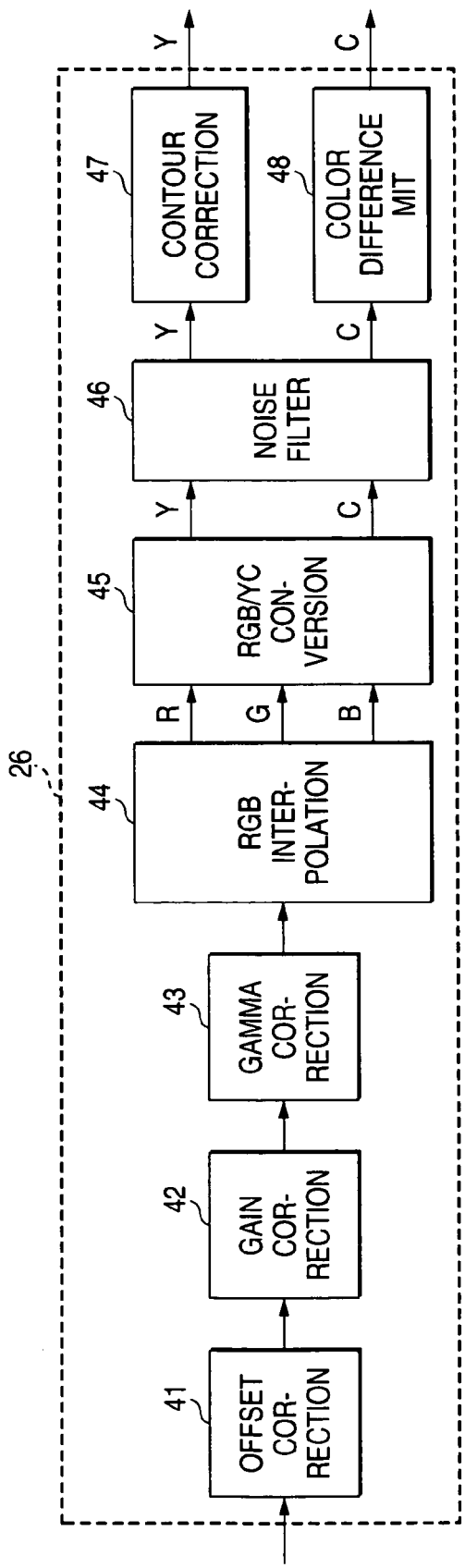
FIG. 2 is a diagram showing in detail the configuration of a digital signal processing section shown in FIG. 1.

FIG. 2 is a diagram showing in detail the configuration of the digital signal processing section 26 shown in FIG. 1. The digital signal processing section 26 comprises: an offset correcting circuit 41 which fetches the digital R, G, and B color signals and luminance detection signal Y output from the A/D converter circuit 23, and which performs the offset processing; a gain correcting circuit 42 which takes white balance; and a gamma correcting circuit 43 which performs gamma correction on the white balance-corrected color signals. In the case where the linear matrix process or the knee correction is to be performed on the offset-corrected signals, the process or the correction is performed between the gain correcting circuit 42 and the gamma correcting circuit 43.

The digital signal processing section 26 further comprises: an RGB interpolation calculating section 44 which performs an interpolation calculation on the gamma-corrected R, G, and B color signals to obtain the three color or R, G, and B signals in respective pixel positions; an RGB/YC converting section 45 which obtains a luminance signal Y and color difference signals Cr, Cb from the R, G, and B color signals and the luminance detection signal Y; a noise filter 46 which reduces the noise level of the luminance signal Y output from the converting section 45; an contour correcting circuit 47 which performs contour correction on the luminance signal Y after the noise reduction; and a color difference matrix circuit 48 which multiplies the color difference signals Cr, Cb by a color difference matrix to perform hue correction.

In the case of a triple-type image pickup element, the RGB interpolation calculating section 44 is not necessary. However, the solid-state image pickup element 11 used in the embodiment is a single-type solid-state image pickup element, and each pixel outputs only one of the R, G, and B color signals or the luminance detection signal Y. In a pixel which outputs R, therefore, the degrees of the colors which are not output, i.e., G and B color signals in the pixel position are obtained by interpolation of the G and B signals of peripheral pixels.

FIG. 3 is a surface diagram of the solid-state image pickup element 11 used in the embodiment. In the solid-state image pickup element 11, many pixels are arranged in a square lattice pattern. Among the arranged pixels, a portion of 5×5=25 pixels is shown in FIG. 3.

Filters Y, and color filters R, G, B are disposed in respective surface portions of the many pixels (photodiodes) (not shown) which are arranged vertically and horizontally in the solid-state image pickup element 11. The filters Y are disposed on the surfaces of pixels which are arranged in a checkered pattern position, among the pixels which are arranged vertically and horizontally. The color filters R, G, B are disposed on the surfaces of pixels which are arranged in other checkered pattern position.

In the solid-state image pickup element 11 exemplarily shown in FIG. 3, the filters are arranged in the sequence of "Y, G, Y, G, . . . " on the respective surfaces of pixels of even rows, and rows of "R, Y, B, Y, R, . . . " and "B, Y, R, Y, B, . . . " are alternately arranged on the surfaces of pixels of odd rows.

The filters Y can be said to be filters having spectral characteristics correlating with luminance information, i.e., luminance filters. ND filters, transparent filters, white filters, gray filters, and the like fall under the category of luminance filters. Also the configuration in which no filter is disposed on the surface of a pixel and light is incident directly on the pixel surface can be said to be a configuration in which a luminance filter is disposed.

In the following description, a pixel having a filter R is referred to as "R pixel", a pixel having a filter G as "G pixel", a pixel having a filter B as "B pixel", and a pixel having a filter Y as "Y pixel".

When a still image having the maximum resolution is to be produced with using image data obtained by the solid-state image pickup element 11 having the above-described configuration, for example, R, G, B, and Y image data are individually read out from the respective pixels of the solid-state image pickup element 11 in the same manner as the related art, and then processed by the digital signal processing section 26.

By contrast, when a reduced image having a ½ resolution in both the vertical and horizontal directions is to be produced with using image data obtained by the solid-state image pickup element 11, in the embodiment, the CPU 15 controls the image pickup element driving section 20 so that image data of two pixels adjacent to each other in the vertical direction are added together as shown in FIG. 4 and then read out from the solid-state image pickup element 11. In other words, the CPU 15 functions as a controlling section (hereinafter sometimes referred to as an adding controlling section) that, when data of a reduced image in which a resolution is more reduced than a resolution of all pixels of the solid-state image pickup element are to be produced, adds data of each of a set of color pixels to be selected among color pixel of the first, second and third color pixels and data of one or more of the luminance detection pixels which are adjacent to said each of the set of color pixels to be selected. In the case of the solid-state image pickup element 11 of the CCD type, the image data (signal charge amounts) may be added together on a vertical transfer path, and, in the case of the solid-state image pickup element 11 of the CMOS type, signal amounts read out by readout transistors in accordance with signal charge amounts of pixels are added together.

In the related art, when a reduced image having a ½ resolution is to be read out, image data (luminance signals) of Y pixels are not read out from the solid-state image pickup element 11, and are discarded. In the embodiment, image data (luminance signals Y) of the Y pixels are added to R, G, and B image data (color signals), and therefore the signal (luminance data) amount received by the Y pixels are not wasted.

Hereinafter, the manner where color information and luminance information can be accurately reproduced from R, G, and B color signals to which luminance data of the Y pixels are added will be described. The original R signal is indicated as "R", the original G signal is indicated as "G", the original B signal is indicated as "B", and the R, G, and B signals which have been read out from the solid-state image pickup element 11, subjected to gamma correction and the like, and interpolated in the RGB interpolation calculating section 44 are indicated as "R'", "G'", and "B'", respectively. Then, the followings hold:

$$R'=R+Y,$$

$$G'=G+Y,$$

$$B'=B+Y.$$

When these expressions are substituted in the general formula for converting the R, G, and B signals to the luminance signal:

$$Y=0.299R+0.587G+0.114B,$$

the following holds (where the luminance calculated from RGB is indicated by Yrgb):

$$\begin{aligned}Yrgb &= 0.299(R'-Y)+0.587(G'-Y)+0.114(B'-Y)\\&= 0.299R'+0.587G'+0.114B'-(0.299+0.587+0.114)Y\\&= Y'-Y.\end{aligned}$$

In the above expression, $$Y'=0.299R'+0.587G'+0.114B'$$

is the luminance obtained from R', G', and B' on the base of the general formula.

Therefore, $$Y'=Yrgb+Y$$

is attained. It will be seen that the luminance Y' obtained from R', G', and B' has a value in which the luminance Y read out from the Y pixels is added to the luminance Yrgb obtained from R, G, and B, and the luminance sensitivity is enhanced.

With respect to the color difference signals Cr, Cb, the followings hold:

$$Cr=R'-Y'=(R+Y)-(Yrgb+Y)=R-Yrgb,$$

$$Cb=B'-Y'=(B+Y)-(Yrgb+Y)=B-Yrgb.$$

It will be seen that the color information is restored.

Figure 5:
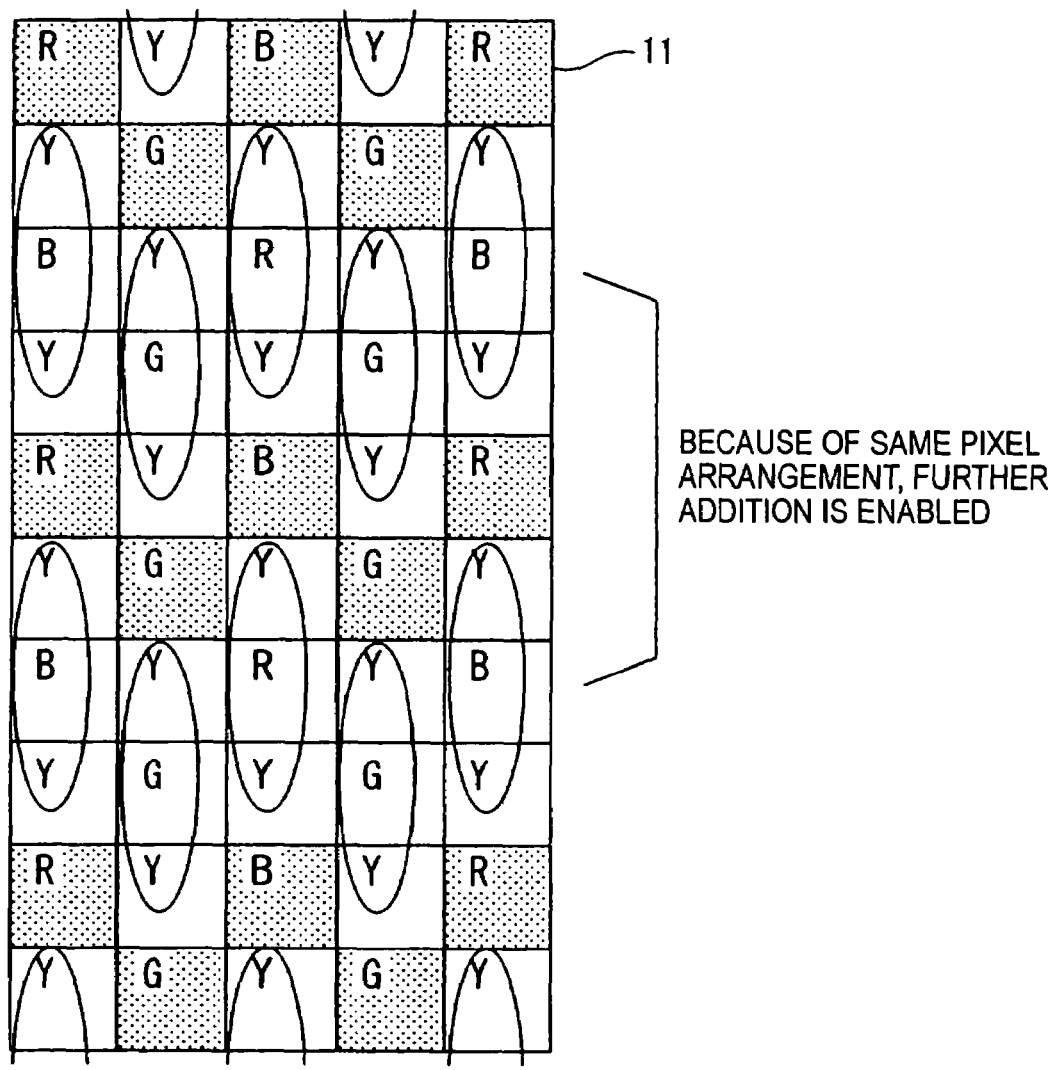
FIG. 5 is a diagram illustrating an example in which a reduced image where the resolution is reduced to ¼ is read out from the solid-state image pickup element shown in FIG. 3.

FIG. 5 is a diagram illustrating an example in which an image where the resolution is reduced to ¼ is read out from the solid-state image pickup element 11, and showing 50 pixels in total of 5 columns and 10 rows of the solid-state image pickup element 11. In this example, image data of three pixels arranged in the vertical direction which are enclosed by an oval in each column are read out with being added together, and one pixel which is among the four pixel arranged in the vertical direction, and which is not enclosed by the oval is decimated so that image data of the pixel is not read out. In the first column, for example, the image data of the B pixel, and the image data of the upper and lower Y pixels are read out with being added together, and the R pixel is decimated so that the image data of the R pixel is discarded.

In this readout method, the followings hold:

$$R'=R+2Y,$$

$$G'=G+2Y,$$

$$B'=B+2Y.$$

These expressions are obtained simply by replacing "Y" in the expressions shown in the description of FIG. 4 with "2Y". Therefore, it will be seen that, when ¼ of all the pixels are not read out, the resolutions can be decimated to ¼, and color information and luminance information can be accurately reproduced.

As seen from FIG. 5, in each column, the arrangements of three pixels which are to be added are identical with each other in the vertical direction. Therefore, the pixel addition is further performed so that six pixels (in the first column, two B pixels and 4 Y pixels) are added together, whereby a further reduced image can be read out without lowering luminance.

In the embodiment described above, it is assumed that the solid-state image pickup element 11 of the CCD type is used and, in the readout of image data from the solid-state image pickup element 11, the pixel addition is performed and the readout is then conducted. In this case, the CPU 15 serving as the adding controlling section may comprise an adding and reading section that, when data are to be read out from each of pixels of the solid-state image pickup element 11, adds data of each of the set of color pixels to be selected and data of one or more of the luminance detection pixels which are adjacent to said each of the set of color pixels to be selected, and reads out resulting data.

By contrast, in the case where a solid-state image pickup element of the MOS type such as the CMOS is used, for example, there is provided the above-mentioned adding controlling section comprising a data adding circuit (data adding section), the adding circuit being disposed in front or rear of the offset correcting circuit 41 shown in FIG. 2, and, after image data of all pixels are read out, addition of image data, i.e., addition of digitized R, G, B, and Y data is performed. The data adding section has a function of, after data of all pixels of the solid-state image pickup element are read out, adding data of each of the set of color pixels to be selected and data of one or more of the luminance detection pixels which are adjacent to said each of the set of color pixels to be selected. In this case, the adding controlling section may not be the CPU 15, and may be further provided separately from the CPU 15.

The adding control section comprising the adding and reading section or the data adding section is primarily constituted of a processor which operates in accordance with a program. For example, but not by way of the limitation, these sections each can be a general purpose computer containing a set of instructions for the foregoing functions.

According to the invention, when a reduced image is read out from the solid-state image pickup element, degradation of a luminance can be avoided, and hence a bright reduced image can be obtained.

In the invention, when a reduced image is read out from a solid-state image pickup element, the readout can be performed without lowering luminance, and hence a reduced image of high luminance can be easily obtained. The invention is suitably used in a digital camera having a motion picture photographing function or a function of displaying a reduced image as a through image on a liquid crystal display device or the like.

The entire disclosure of each and every foreign patent application from which the benefit of foreign priority has been claimed in the present application is incorporated herein by reference, as if fully set forth.

What is claimed is:

1. A digital camera comprising a solid-state image pickup element, the solid-state image pickup element comprising:
    first color pixels which detect an amount of incident light of a first color of three primary colors;
    second color pixels which detect an amount of incident light of a second color of the three primary colors;
    third color pixels which detect an amount of incident light of a third color of the three primary colors; and
    luminance detection pixels which detect luminance information, each of the luminance detection pixels being adjacent to each color pixel of the first, second and third color pixels,
    wherein the digital camera comprises:
        a controlling section that, when data of a reduced image in which a resolution is more reduced than a resolution of all pixels of the solid-state image pickup element are to be produced, adds data of each color pixel in a set of color pixels to be selected among the first, second and third color pixel, and data of one or more of the luminance detection pixels which are adjacent to said each color pixel in the set of color pixels to be selected; and
        a signal processing section that processes data of the set of color pixels to be selected to which data of luminance detection pixels have been added, and reproduces a photographed image.

2. A digital camera according to claim 1, wherein the solid-state image pickup element comprises a CCD type solid state image pickup element, and
    wherein the controlling section comprises an adding and reading section that, when data are to be read out from each of the pixels of the solid-state image pickup element, adds data of each of the set of color pixels to be selected and data of one or more of the luminance detection pixels which are adjacent to said each of the set of color pixels to be selected, and reads out resulting data.

3. A digital camera according to claim 2, wherein data of each of a set of color pixels to be selected among color pixel of the first, second and third color pixels and data of one or more of the luminance detection pixels which are adjacent to said each of the set of color pixels to be selected are added together on a vertical transfer path.

4. A digital camera according to claim 2, wherein the adding and reading section comprises a data adding circuit, which, after image data of all color pixels and luminance detection pixels are read out, adds data of each of a set of color pixels to be selected and data of one or more of the luminance detection pixels which are adjacent to said each of a set of color pixels to be selected.

5. A digital camera according to claim 1, wherein the solid-state image pickup element comprises a MOS type solid state image pickup element, and
    wherein the controlling section comprises a data adding section that, after data of all pixels of the solid-state image pickup element are read out, adds data of each of the set of color pixels to be selected and data of one or more of the luminance detection pixels which are adjacent to said each of the set of color pixels to be selected.

6. A digital camera according to claim 5, further comprising a plurality of readout transistors,
    wherein data of each of a set of color pixels to be selected among color pixel of the first, second and third color pixels and data of one or more of the luminance, detection pixels which are adjacent to said each of the set of color pixels to be selected are read by a plurality of readout transistors and are added together.

7. A digital camera according to claim 1, wherein the first, second and third color pixels and the luminance detection pixels are arranged in a surface portion of the solid-state image pickup element so as to form a square lattice pattern, and
    wherein the square lattice pattern comprises:
        a first checkered pattern in which the first, second and third color pixels are arranged; and
        a second checkered pattern in which the luminance detection pixels are arranged.

8. A digital camera according to claim 7, wherein Y represents a luminance detection pixel, G represents a green color pixel, R represents a red color pixel, and B represents a blue color pixel, and
    wherein the square lattice pattern comprises color pixels and luminance detection pixels arranged in a repeating sequence of alternating Y and G pixels on even rows and a repeating sequence of R, Y, B, Y pixels and a repeating pattern of B, Y, R, Y pixels are alternately arranged on odd rows.

9. A digital camera according to claim 1, wherein data of each of the set of color pixels to be selected and data of one or more of the luminance detection pixels which are vertically adjacent to said each of the set of color pixel to be selected are added together.

10. A digital camera according to claim 1, wherein the luminance detection pixel comprises a filter having spectral characteristics correlating with luminance information.

11. A digital camera comprising a solid-state image pickup element, the solid-state image pickup element comprising:
   first color pixels which detect an amount of incident light of a first color of three primary colors;
   second color pixels which detect an amount of incident light of a second color of the three primary colors;
   third color pixels which detect an amount of incident light of a third color of the three primary colors; and
   luminance detection pixels which detect luminance information, each of the luminance detection pixels being adjacent to each color pixel of the first, second and third color pixels,
   wherein the digital camera comprises:
      controlling means for, when data of a reduced image in which a resolution is more reduced than a resolution of all pixels of the solid-state image pickup element are to be produced, adding data of each color pixel in a set of color pixels to be selected among the first, second and third color pixels, and data of one or more of the luminance detection pixels which are adjacent to said each color pixel in the set of color pixels to be selected; and
      signal processing means for processing data of the set of color pixels to be selected to which data of luminance detection pixels have been added, and reproducing a photographed image.

12. A digital camera according to claim 11, wherein the solid-state image pickup element comprises a CCD type solid state image pickup element, and
   wherein the controlling means comprises adding and reading means for, when data are to be read out from each of the pixels of the solid-state image pickup element, adding data of each of the set of color pixels to be selected and data of one or more of the luminance detection pixels which are adjacent to said each of the set of color pixels to be selected, and reading out resulting data.

13. A digital camera according to claim 11, wherein said solid-state image pickup element comprises a MOS type solid state image pickup element, and
   wherein the controlling means comprises data adding means for, after data of all pixels of the solid-state image pickup element are read out, adding data of each of the set of color pixels to be selected and data of one or more of the luminance detection pixels which are adjacent to said each of the set of color pixels to be selected.

14. A digital camera according to claim 11, wherein the first, second and third color pixels and the luminance detection pixels are arranged in a surface portion of the solid-state image pickup element so as to form a square lattice pattern, and
   wherein the square lattice pattern comprises:
      a first checkered pattern in which the first, second and third color pixels are arranged; and
      a second checkered pattern in which the luminance detection pixels are arranged.

15. A digital camera according to claim 11, wherein data of each of the set of color pixels to be selected and data of one or more of the luminance detection pixels which are vertically adjacent to said each of the set of color pixel to be selected are added together.

16. An imaging device comprising:
   a solid-state image pickup element comprising:
      a plurality of color pixels, in which each pixel of a plurality of color pixels detects an amount of incident light of a single color, wherein a plurality of different colors are detected; and
      a plurality of luminance detection pixels which detect luminance information, each of the luminance detection pixels being adjacent to a pixel of said plurality of color pixels;
   a controlling section that, when data of an image in which a resolution less than a resolution of all pixels of the solid-state image pickup element are to be produced, adds data of each of a set of color pixels to be selected among said plurality of color pixels, and data of one or more of the luminance detection pixels which are adjacent to said each color pixel in the color pixels of the set of color pixels to be selected; and
   a signal processing section that processes data of the set of color pixels to be selected to which data of luminance detection pixels have been added, and reproduces an image.

17. An imaging device according to claim 16, wherein the plurality of color pixels include red color pixels, blue color pixels, and green color pixel; and
   wherein the primary colors are interpolated such that: R'=R+Y, G'=G+Y, and B'=B+Y, wherein R' corresponds to an interpolated red signal, R corresponds to a signal from a red color pixel and Y corresponds to a signal from a luminance detection pixels, G' corresponds to an interpolated green signal, G corresponds to a signal from a from a green color pixel, B' corresponds to an interpolated blue signal, and R corresponds to a signal from a red color pixel.

18. An imaging device according to claim 17, wherein the luminance calculated from ROB comprises the equation $Y_{rgb}=C1(R'-Y)+C2(G'-Y)+C3(B'-Y)$, where C1, C2 and C3 are constants,
   wherein a color difference signal $Cr=R-Y_{rgb}$, and
   wherein a color difference signal $Cb=B-Y_{rgb}$.

* * * * *